Oct. 16, 1951

A. E. CRAVER 2,571,210

RECOVERY OF GLYCERINE

Filed May 19, 1949

INVENTOR.
AUGUSTUS E. CRAVER
BY
Thomas R O'Nally
ATTORNEY

Patented Oct. 16, 1951

2,571,210

UNITED STATES PATENT OFFICE 2,571,210

RECOVERY OF GLYCERINE

Augustus E. Craver, Fredericksburg, Va., assignor to American Viscose Corporation, Wilmington, Del., a corporation of Delaware Application May 19, 1949, Serial No. 94,083

3 Claims. (Cl. 260—637)

The invention relates to the recovery of glycerine from fermented liquors.

While glycerol solutions of high clarity and free from impurities may be produced by the fermentation of colorless sugar solutions, molasses from cane or beet sugar is a more economical source of sugar for this purpose. However, the fermentation of molasses solutions always results in a fermented liquor which contains a wide variety of impurities and by-products and has a pronounced dark color. The by-products include volatile substances such as alcohol, acetone, acetic acid, and the like, while the impurities comprise pectins. unfermented sugar, cellulose, natural gums and resins, inorganic salts, especially salts of alkaline earth metals and iron and sulphates. The color of the solution obtained by the fermentation of molasses is due in part to organic colloids and in part to the presence of iron. It is apparent that the recovery of a substantially pure and colorless solution of glycerine from such a complex system involves numerous difficulties.

It is the object of the present invention to provide a method for the production of substantially clear and colorless glycerol solutions from fermentation liquors.

It is a specific object of the present invention to provide a process for the recovery of a substantially clear and colorless solution of glycerol from the liquor produced by the fermentation of molasses.

It is a further specific object to remove from fermentation glycerol solutions such inorganic impurities as calcium, iron, and sulphates.

It is another specific object to reduce the color of glycerol solutions produced by fermentation so that the solution is adapted for use as a softening agent for transparent sheeting and in pharmaceuticals.

A further object is to provide a continuous, counter-current dialysis system comprising a plurality of dialyzers in series for recovering the glycerine, in which the flow of either the dialysate or diffusate or both may be accomplished either by gravity entirely or the flow within any or all of the cells may be augmented by forced circulation using a pump to increase the circulation or agitation within the respective cells while bleeding off a portion continuously to the next cell in the series. The forced circulation system increases the agitation of the liquid at the membrane surfaces and thereby increases the rate of dialysis.

Further objects of the invention will in part be obvious and will in part appear hereinafter.

According to the present invention there is provided a process for the purification of fermented liquors including the steps of treating a fermented liquor to filter off the yeast, acidifying the filtrate, distilling off volatile impurities, such as alcohol, acetone, and so on, concentrating by continued evaporation or distillation, thereafter dialyzing under conditions described hereinafter, precipitating iron from the diffusate and removing other inorganic salts from the diffusate by ion exchange, and, when necessary, decolorizing the diffusate by contacting it with an absorbent material. The glycerine solution obtained as the diffusate may then be concentrated, if desired.

The fermented liquor is subjected to the preliminary treatments specified prior to being subjected to the essential purifying and clarifying steps of the present process starting with dialysis. Normally, it will be desirable to evaporate from the liquor the volatile organic substances, such as alcohol, acetone, acetic acid, and the like. This is normally carried out by distillation in copper stills. Since ammonia is frequently produced during such distillation, it is necessary to acidify the fermenting liquor and to maintain it acid during the distillation. Therefore the residue, after distillation may desirably be neutralized with any suitable alkaline compound, such as lime, sodium hydroxide, potassium bicarbonate, and the like and then concentrated until the liquor is concentrated to about 50% of its volume. Such concentration reduces the volume of liquid to be treated by the subsequent purification process. The fermented liquor, after such concentration, is heated to at least 60° C. and preferably to a temperature above 70° C., and the heated solution is then dialyzed in counterflow relationship with water heated to at least 50° C., and preferably above 70° C.

Figure 1:
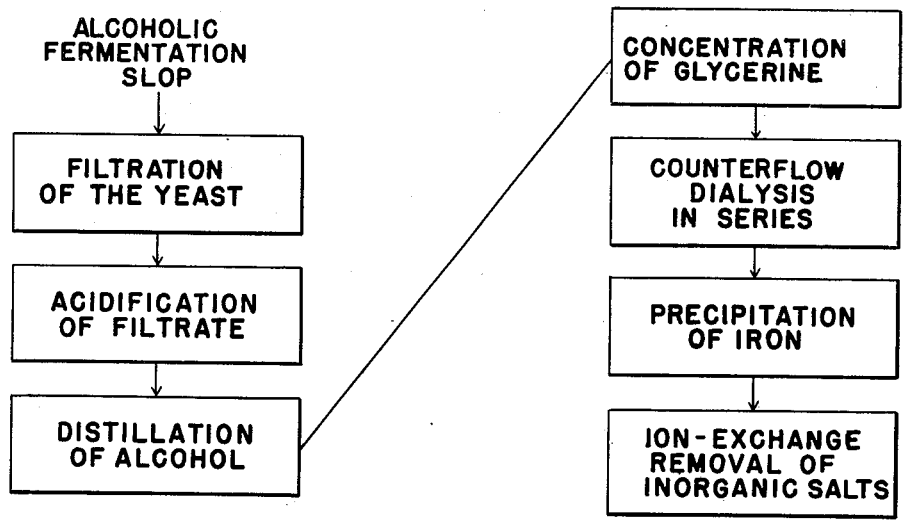
Figure 1 is a flow sheet showing the essential steps of the process.
Figure 2:
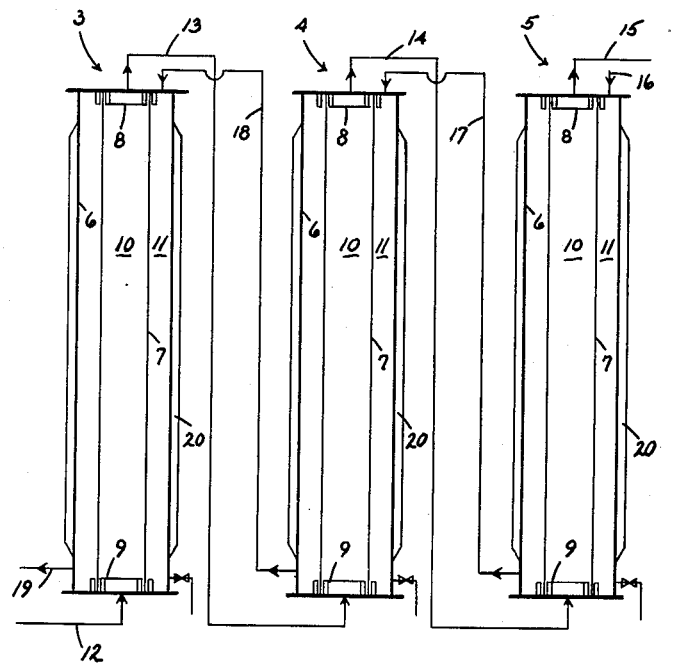
Figure 2 is a diagrammatic view of a dialyzing system for executing the invention.

Figure 2 shows a system comprising a plurality of dialyzing cells (three being shown though more, such as five, six or a greater number, or less than three can be used in series). These cells are designated 3, 4, and 5 and each comprises a cylindrical pipe, vessel or shell 6 containing one or more cylindrical dialyzing membranes 7. While a single vessel 6 may contain up to one hundred or two hundred dialyzing membranes uniformly distributed when viewed in section, such as at the intersections of three sets of equidistantly spaced, parallel lines, of which the lines of each set are inclined at a 60° angle to the lines of the other sets, such as shown in 2,411,238 when one membrane is used as shown, it is preferably supported concentrically within the shell 6 by suitable sealing clamps 8 and 9 provided in the end walls or closures of the shell. The diaphragm or membrane 7 thus divides the interior of the shell into two distinct spaces 10 and 11 between which the sole communication is through the semi-permeable membrane 7. A conduit 12 supplies the impure solution to be dialyzed to the central space 10 within the membrane 7 of cell 3. A conduit 13 directs the dialysate from cell 3 into the space 10 of cell 4, and a conduit 14 directs the dialysate from cell 4 to the space 10 of cell 5. The final dialysate is discharged through conduit 15 to the next step of the process or to any suitable storage vessel. The water which becomes the diffusate is introduced by conduit 16, into the annular space 11 of cell 5, passes through pipe 17 into space 11 of cell 4, and then through pipe 18 into space 11 of cell 3. The final diffusate is discharged from the system through pipe 19. Each cell is preferably jacketed at 20 with heat insulation or with a hollow jacket into which a heated fluid may be introduced.

For the dialysis membrane there may be employed parchment paper or a hydrophilic pellicle, such, for example, as regenerated cellulose produced from viscose or by the denitration of nitrocellulose, or from cuprammonia solutions of cellulose. In the now preferred embodiment the dialysis membrane is a tube of regenerated cellulose.

If desired, the dialysate may be concentrated by distillation between the dialyzing cells, and preferably just before entering the final cell in the series. The dialysate and/or the diffusate may be filtered, or chemically treated, such as to raise or lower the pH, between dialyzing cells.

By the dialysis the glycerol and other water-soluble substances are separated from the organic colloids. The diffusate thus obtained is next treated to precipitate iron, such as by a water-soluble sufide, e. g. sodium sulfide. Then, other inorganic salts are removed by passing the diffusate over base exchange salts or resins by which they are converted to sodium compounds. Cations may then be removed by passing the diffusate over cation absorbing resins, and if desired, the solution can be decolorized with activated carbon, silica gel or other absorbent. For example, with activated carbon, the treatment is carried out at a temperature from 40 to 100° C., preferably 80° C., while the solution is slightly acid. The activated carbon removes most of the residual color due to organic substances. The clarified solution thus obtained is filtered to recover the spent carbon. The spent carbon may be reactivated by heating in a conventional manner and then re-used.

The solution thus obtained is substantially free of iron and alkaline earth metal salts and of sulphates. It is characterized by being substantially clear and colorless, depending upon the extent of decolorizing. The glycerine solution thus obtained is sufficiently clear and colorless to be employed as a softening agent for transparent materials such as cellophane, gelatin, casein and papers of all kinds, including glassine paper, leather, cosmetics and pharmaceuticals, and in the manufacture of synthetic resins.

By way of illustration but not by way of limiting the invention, there will be given the following specific example:

A liquor resulting from the fermentation of molasses in an alkaline medium for the production of glycerol is filtered, rendered slightly acid, and the alcohol and acetone distilled off in a copper still. The residue is then concentrated to about 50% of its initial volume and then neutralized with a 10% aqueous solution of potassium bicarbonate. The concentrated liquid is then heated to about 75° C. and passed through the series of cells of the dialyzing system of Fig. 2 in countercurrent to a stream of water heated to a temperature of 75° C. The semi-permeable membranes were of regenerated cellulose and were entirely covered by the liquids. This submergence of the membranes and operation at high temperature prevented bacterial decomposition of the cellulose. Iron was precipitated from the diffusate by introduction of sodium sulfide, and then the diffusate is passed through an ion exchanger containing a synthetic resin ion exchange absorbent, such as Amberlites IR-100 and IR-4. The Amberlite IR-100 is used in the hydrogen cycle (hydrochloric acid as the regenerant) whereas IR-4 is used in the potassium cycle (potassium carbonate as the regenerant). The diffusate is run through a column of IR-100 first and then through IR-4. The diffusate is then treated with activated carbon.

By this process, glycerine solutions introduced into the first cell of the dialyzing system and having between 20 and 35% glycerine content by weight are reduced in the first tube (having a length of about 20 to 25 feet and a diameter of about 1½ inches mounted within a 3-inch pipe) to about 9 to 15%, in the second tube to about 5 to 10% glycerine and in the third tube to between less than 0.5 and 3%. The water introduced picks up a content of about ½ to 1½% glycerine in the first tube, which is increased to about 1½ to 3% in the second tube, and about 4 to 7% in the third tube when the ratio of water fed to glycerine solution fed is between about 2:1 and 6:1. The diffusate may be further concentrated in conventional manner, if desired.

The continuous series dialysis system has a number of effects, the benefits of which increase in proportion to the number of dialyzing cells in series. Over-all, these effects result in increased linear velocities of dialysate and diffusate, and consequent increase in the rate of dialysis and efficiency of dialysis per unit area of membrane. These effects or actions are:

(a) sweeping of the droplets of glycerine away from the membrane surface on the diffusate side.

(b) maintaining the more or less insoluble and/or colloidal or semi-colloidal particles in suspension, thereby reducing or eliminating the clogging by these materials in various parts of the apparatus and particularly the deposition of this material on the membrane, thus partially blocking the dialysis.

(c) increasing of the agitation of both the dialysate and diffusate at the membrane surface.

I claim:

1. A process for recovering glycerine from alcoholic fermentation solutions, comprising the steps of filtering the solution to remove yeast, acidifying the filtrate, removing volatile impurities by distillation, concentrating the distilland to 50% of its original volume by continuing the evaporation or distillation, neutralizing the concentrate with aqueous potassium bicarbonate, passing the concentrate through a plurality of dialyzing cells in series in counter-current flow to water, precipitating iron from the diffusate, removing inorganic salts from the diffusate by subjecting it to ion exchange, and thereafter decolorizing the diffusate by contacting it with an absorbent material, such as activated carbon.

2. A process for recovering glycerine from alcoholic fermentation solutions, comprising the steps of filtering the solution to remove yeast, acidifying the filtrate, removing volatile impurities by distillation, concentrating the distilland to 50% of its original volume by continuing the evaporation or distillation, neutralizing the concentrate with aqueous potassium bicarbonate, passing the concentrate through a plurality of dialyzing cells in series in counter-current flow to water while maintaining the concentrate and water at a temperature of at least 50° C. and said dialyzing cells containing tubular dialyzing membranes made of regenerated cellulose completely submerged in the liquids passing therethrough, precipitating iron from the diffusate, removing inorganic salts from the diffusate by subjecting it to ion exchange, and thereafter decolorizing the diffusate by contacting it with an absorbent material, such as activated carbon.

3. A process as defined in claim 2 wherein the ratio of water to concentrate passed through the plurality of dialyzing cells is between 2:1 and 6:1.

AUGUSTUS E. CRAVER.

REFERENCES CITED

The following references are of record in the file of this patent:

UNITED STATES PATENTS

| Number | Name | Date |
|---|---|---|
| 1,344,850 | Bassett | June 29, 1920 |
| 1,357,138 | Bassett | Oct. 26, 1920 |
| 2,381,055 | Hoyt | Aug. 7, 1945 |
| 2,390,779 | Cornwell | Dec. 11, 1945 |
| 2,437,939 | Cornwell et al. | Mar. 16, 1948 |